UNITED STATES PATENT OFFICE.

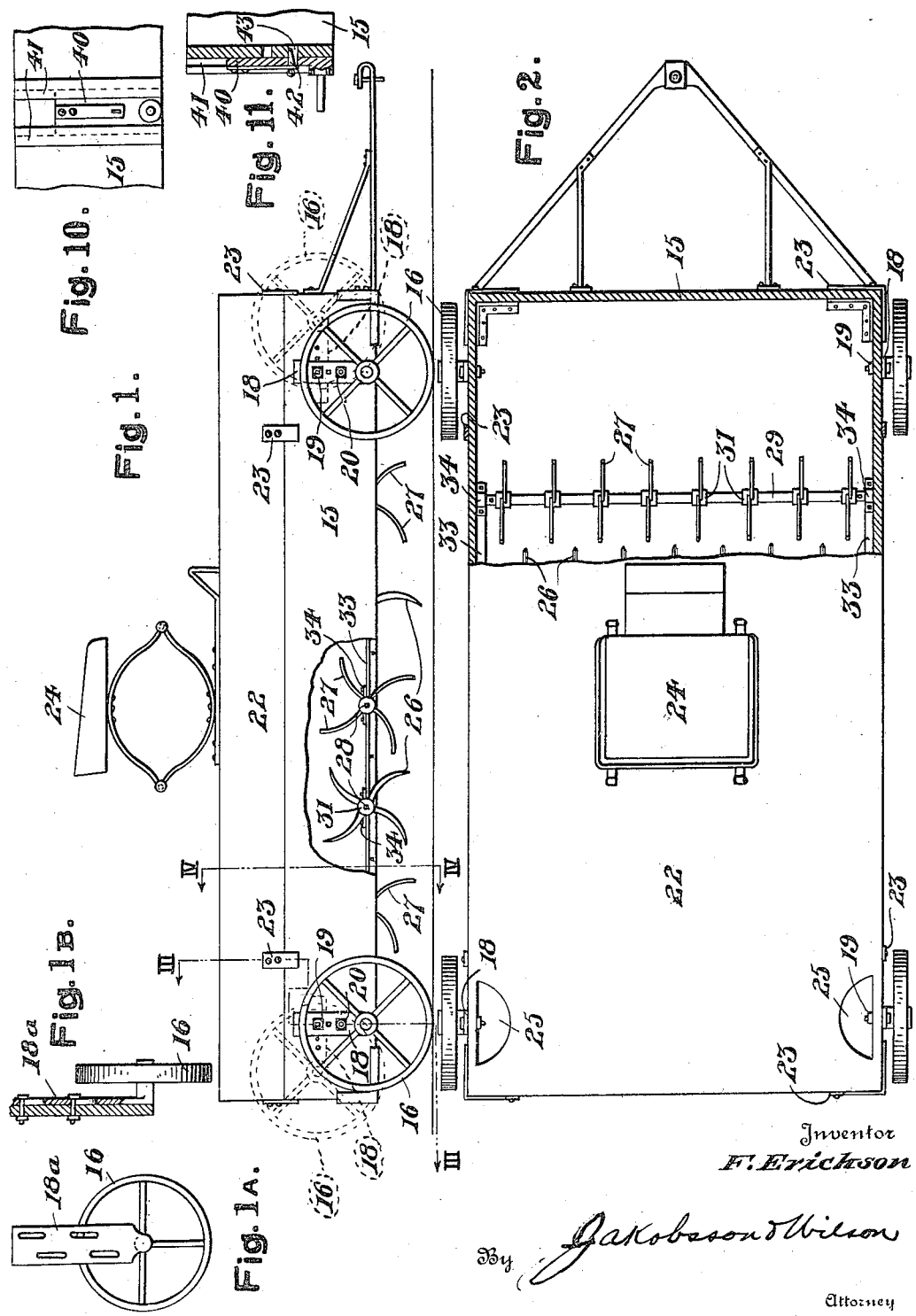

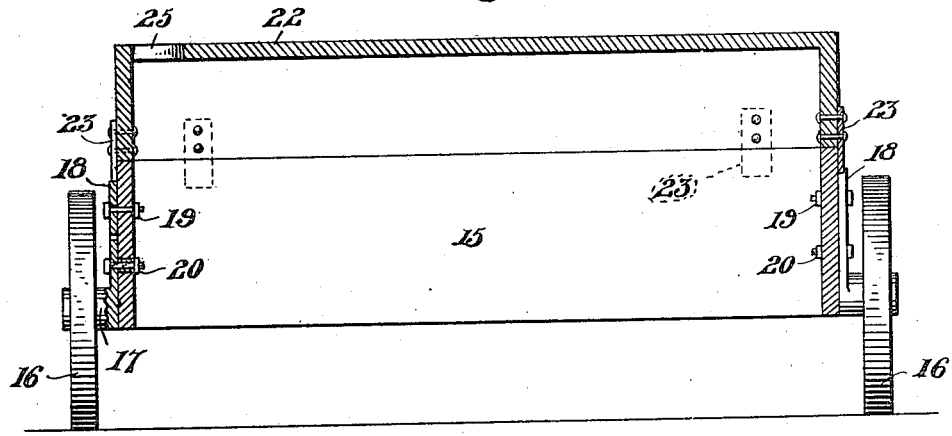
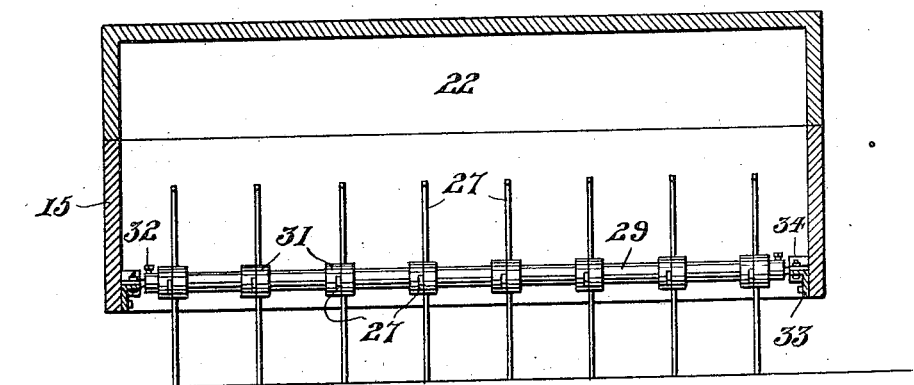
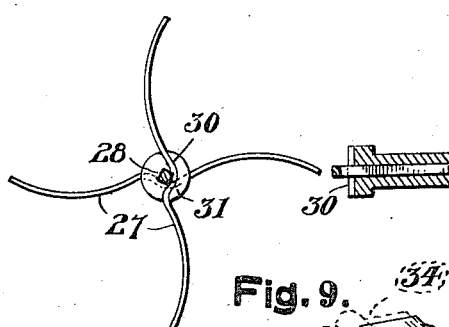
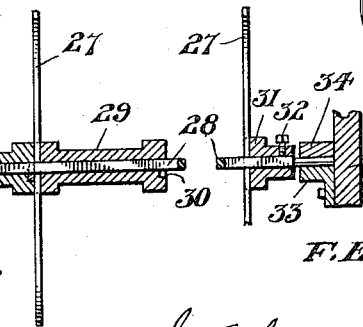
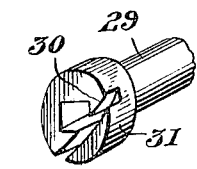
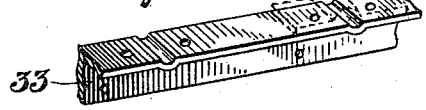

FRITZ ERICKSON, OF PHILIPSBURG, MONTANA.

ROTARY HARROW.

1,261,727.　　　　Specification of Letters Patent.　　Patented Apr. 2, 1918.

Application filed December 1, 1916. Serial No. 134,487.

*To all whom it may concern:*

Be it known that I, FRITZ ERICKSON, a citizen of the United States, residing at Philipsburg, in the county of Granite and State of Montana, have invented certain new and useful Improvements in Rotary Harrows, of which the following is a specification.

The present invention relates to an agricultural implement for tilling the soil and more particularly to a rotary harrow and has for its object to provide such an implement of simple construction, easy to transport to or from the place of operation and in which the tines, spikes or blades may be easily replaced in case of accident, or entirely removed in groups if desired. Other advantages and objects will be made evident from the following description.

In the accompanying drawings, one embodiment of the invention has been illustrated, and, Figure 1 is a side view partly in section of the harrow in position for transportation.

Fig. 2 is a plan view of Fig. 1 partly in section.

Fig. 3 is a transverse section on line III—III of Fig. 1 on a larger scale.

Fig. 4 is a similar section on line IV—IV of Fig. 1.

Fig. 5 is a side view in larger scale of the tine or spike mounting.

Fig. 6 is a vertical section of Fig. 5.

Fig. 7 is a similar view showing the bearing for the spike shaft.

Fig. 8 is a perspective view of a spike carrier or sleeve.

Fig. 9 is a portion of a bearing block for the spike shafts.

Figs. 10 and 11 are a section and elevation respectively, showing a modified form of wheel mounting, and Figs. 1$^a$ and 1$^b$ are detail views of another modified form of wheel mounting.

The frame 15 of rectangular shape is provided with four detachable wheels 16. They are preferably carried on short stub shafts 17 having an upwardly-extending bracket portion 18 for attachment to the frame. In the bracket portion are to be found several holes intended for engagement with corresponding studs 19 in the frame as well as securing bolts 20. By means of this arrangement it is not only possible to raise or lower the wheels to suit conditions, but also to swing them up out of the reach of the ground as indicated in dot and dash lines in Fig. 1, or to detach them entirely, when the harrow is in operation. In order to secure the wheel brackets in the swing up position, pins are provided for engaging with holes in the frame corresponding to those in the brackets.

Instead of swinging the wheel bracket out of the way, I might use the modified form illustrated in Figs. 10 and 11, where the bracket 40 is mounted slidably in vertical guides 41 and held in position by a snap or spring bolt 42 engaging in a corresponding hole 43 in the frame. To raise the wheel off the ground all that is necessary in this case is to draw out the bolt 42, which will subsequently snap into the upper hole 44 and retain the wheel in its upper position.

In the form of wheel mounting shown in Figs. 1$^a$ and 1$^b$, the wheel 16 is supported in the usual manner upon the stub axle 17 carried by the bracket arm 18$^a$, the openings in the bracket for the reception of the fastening members 19 and 20 being of elongated shape as illustrated to permit a limited vertical movement of the wheels and brackets upon the frame 15 when obstructions or unequal heights are encountered upon the surface of the ground.

A removable top 22 of the same shape and size as the frame is placed upon the latter and metal straps 23 are provided for keeping the top in position, and a seat 24 for the driver may be carried on the top. Openings 25 are preferably made in the top so that the bolts 20 may be reached from above without removing the top.

The harrow proper consists of alternate rows of thin knife blades 26 and tines or spikes 27 of preferably square cross-section. Both the knives and the spikes are mounted in the same manner on square sectioned shafts 28 by means of muffs or sleeves 29 fitting closely over the square shafts and provided with enlarged ends, in each of which is cut a groove 30 of the same shape as the spike or knife which it is intended to carry. The groove runs preferably to one side of the hole for the shaft 28 and opens at two opposite points of the periphery, the muffs 29 being mounted on the shafts in such a manner that two adjacent spikes or knives cross each other as seen in Fig. 5, one muff carrying one spike and the next muff the other.

The two outermost muffs 31 on each shaft are only about half the length of the inner ones and carry a blade on one side only. A set screw 32 is provided in the short muffs 31 so as to tighten on the muffs with knives and spikes on the respective shafts.

In Fig. 9 is shown a bearing block 33 common for all the shafts, one such bearing block being secured on each side of the frame 15. Each shaft, the ends of which are cylindrical, has its own pair of caps 34, so that it may be removed without disturbing the other shafts. The distance between the bearing blocks 33 is slightly greater than the added length of all the muffs 29, 31 thereon, so that by loosening a set screw 32 any one of the knives or spikes may be taken out for repair or replaced by a new one.

Generally all the shafts are in position during operation of the harrow, but at times it might be advantageous to use it with only the knives, when the spike-carrying shafts may be easily removed by first taking off their caps, or the latter shafts may be retained and the others removed.

As soon as the work is completed, the wheels on the harrow are lowered so that the spikes or blades do not touch the ground and the implement may be driven back to tool house with ease and without an extra wagon as is usual to carry harrows and plows on when brought back and forth from the field of operation.

What I claim as new is:—

1. A mounting for harrow tines comprising a revolving shaft, a plurality of muffs slidably but non-revolubly mounted on said shaft, means for attaching the muffs rigidly together with their adjacent ends contacting, said ends each being provided with a transverse groove passing to one side of said shaft for receiving and rigidly holding one of said tines.

2. A mounting for harrow tines comprising a revolving shaft, a plurality of muffs formed with enlarged ends and slidably but non-revolubly mounted on said shaft, means for attaching the muffs rigidly together with their adjacent ends contacting, said ends each being provided with a transverse groove passing to one side of said shaft and receiving and rigidly holding one of said tines.

3. A mounting for harrow tines comprising a revolving shaft, a plurality of muffs slidably but non-revolubly mounted on said shaft, means for attaching the muffs rigidly together with their adjacent ends contacting, said ends each being provided with a transverse groove passing to one side of said shaft for receiving and rigidly holding one of said tines, said groove opening at two diametrically opposite points of the periphery of each muff end.

4. A mounting for harrow tines comprising a revolving shaft, a plurality of muffs slidably but non-revolubly mounted on said shaft, means for attaching the muffs rigidly together with their adjacent ends contacting, said ends each being provided with a transverse groove passing to one side of said shaft for receiving and rigidly holding one of said tines, said groove opening at two diametrically opposite points of the periphery of each muff end, the muffs having such relative position that the tine in one muff crosses a tine in the adjacent muff.

5. A mounting for harrow tines comprising a revolving shaft, a plurality of muffs slidably but non-revolubly mounted on said shaft, means for attaching the muffs rigidly together with their adjacent ends contacting, said ends each being provided with a transverse groove passing to one side of said shaft for receiving and rigidly holding one of said tines, said means including set screws on the end muffs.

In testimony whereof I affix my signature in presence of two witnesses.

FRITZ ERICKSON.

Witnesses:
 ISAAC REX,
 GEORGE JOHNSON.

Copies of this patent may be obtained for five cents each, by addressing the "Commissioner of Patents, Washington, D. C."